A. WAKAMAN.
Trolling-Hook.

No. 218,345.  Patented Aug. 5, 1879.

Witnesses.
Geo. D. Prescott
Robert Hillson

Archer Wakaman
Inventor.
his Atty
Alex. Selkirk

UNITED STATES PATENT OFFICE.

ARCHER WAKAMAN, OF CAPE VINCENT, NEW YORK.

IMPROVEMENT IN TROLLING-HOOKS.

Specification forming part of Letters Patent No. 218,345, dated August 5, 1879; application filed July 15, 1878.

*To all whom it may concern:*

Be it known that I, ARCHER WAKAMAN, of Cape Vincent, in the county of Jefferson and State of New York, have invented certain new and useful Improvements in Artificial Fish and Trolling-Hooks, of which the following is a specification.

My invention relates to artificial minnows and trolling-hooks; and it consists in constructing the same with a tubular shell provided with blades or fins, by which a rotary motion is imparted to it, and so arranging the shell that it may move freely forward upon the main snood, by which it is attached to the line; in placing the swivel of the main snood within the body of the shell, thereby permitting the shell and hooks, a portion of which project through slots in its sides, to revolve freely, while preventing weeds, grass, or similar substance from becoming twisted about the swivel and interfering with its operation.

Figure 1:
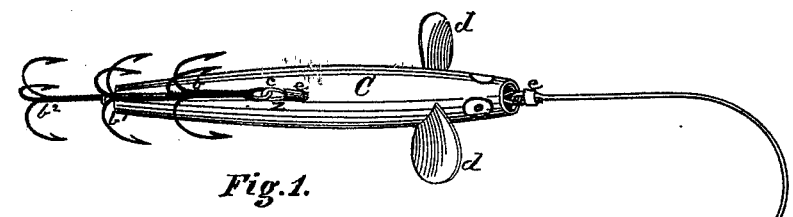
Figure 2:
Figure 3:
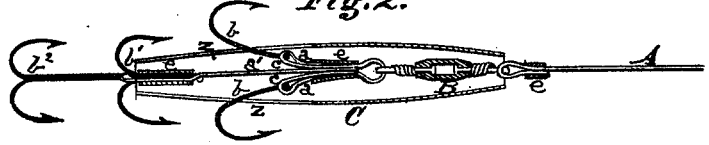

In the accompanying drawings, Figure 1 represents a top-plan view of my improved device; Fig. 2, a longitudinal central section of the same; Fig. 3, a similar view, enlarged, and with the shell removed; and Fig. 4, a cross-section of the clasp for securing the ends of the snoods.

A represents the main snood, attached at one end to a swivel, B, of ordinary construction, to the other end of which swivel are attached branch snoods $a$ $a'$, provided with hooks or clusters of hooks $b$ $b^1$ $b^2$. C represents a tubular shell of metal, made to correspond somewhat to the form of a minnow or fish, and furnished with curved fins or blades $d$, so arranged as to impart a rotary motion to the shell as it is drawn through the water. The shell C is provided, either above and below or in its sides proper, with slots Z, extending about one-half the length of the shell, more or less, from the rear end toward the middle, through which slots the hooks $b$ extend when the device is in use, as indicated in Fig. 2, the shell C being arranged to inclose or cover the branch snoods $a$ $a'$ and the swivel B, as shown, and at the same time free to move forward off the branch snoods, the backward movement of the shell being limited by the hooks $b^1$.

By this construction, it will be seen that as the shell C is made to rotate through the action of the fins or blades $d$ it imparts a like rotation to the hooks $b$, which project through its sides, and through them to the other hooks, the swivel B permitting this rotation to take place without causing any twisting of the main snood A; that in the event of the minnow being swallowed or taken into the mouth of a fish, the shell will be instantly discharged from the mouth of the fish and thrown forward on the main snood, leaving the hooks free to hold the fish, and preventing its working off the hooks by biting upon the shell; and that the swivel B, being inclosed by the shell C, cannot become inoperative by reason of grass or weeds twisting about it and the snoods.

Figure 4:
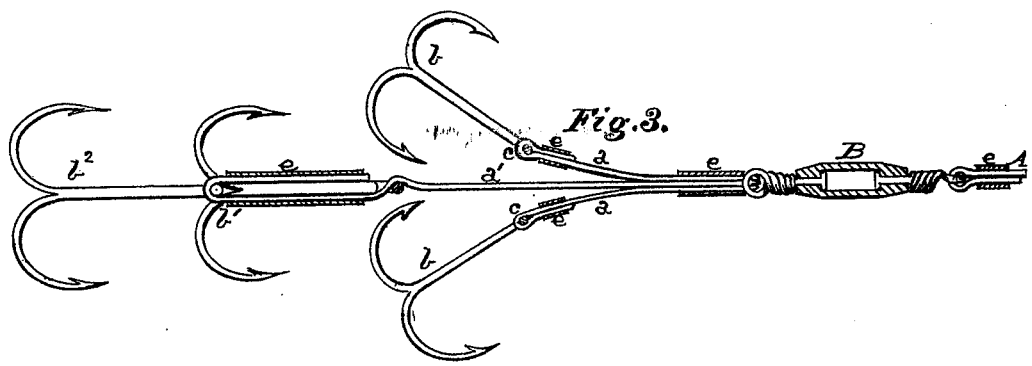

In order to afford a secure and convenient means of attaching the hooks and snoods, I provide a tubular metal clasp, $e$, which is made of proper size to receive one, two, or more of the snoods, as may be required. The end of the snood is passed through the eye of the hook, swivel, or whatever is to be attached, and is then turned back and laid upon itself, as shown in Figs. 1 and 2, and the clasp $e$ is then passed over and around the two parts, and pressed closely down upon the same at its ends, and also creased or folded in between the strands, as shown in Fig. 4 at $v$. This fastening is equally applicable for securing one or several snoods, as indicated in Fig. 2, and is readily applied without loss of time; and it may also be quickly removed by inserting a pointed tool in the end of the clasp and thereby opening the same, when it is desired to attach a new or different hook or other device.

By these improvements the action of the device in practical operation is greatly improved, the fish being prevented from working off the hooks, the swivel prevented from becoming inoperative, and a convenient and ready means being provided for attaching and removing the device or any of its parts when desired.

Having thus described my invention, what I claim is—

1. The combination of a snood or line, a hook or hooks, a swivel connecting the hook with the line, and a hollow imitation minnow inclosing and protecting the swivel, and capable of sliding forward and backward, as and for the purpose set forth.

2. The combination of a line, a hook, a connecting-swivel, and a hollow imitation minnow completely inclosing and protecting the swivel, as shown.

3. In combination with the line and hooks, the sliding imitation minnow inclosing the line and provided with slots to admit the hooks, as shown, whereby the minnow is permitted to pass backward to the hooks.

ARCHER WAKAMAN.

Witnesses:
MARTIN BROWN,
G. G. PERRINE.